(12) United States Patent
Muscatell

(10) Patent No.: US 11,015,870 B2
(45) Date of Patent: May 25, 2021

(54) WATER TANK FOR USE IN AN AIR-CONDITIONING OR HEATING SYSTEM

(71) Applicant: Ralph Muscatell, Fort Lauderdale, FL (US)

(72) Inventor: Ralph Muscatell, Fort Lauderdale, FL (US)

(*) Notice: Subject to any disclaimer, the term of this patent is extended or adjusted under 35 U.S.C. 154(b) by 127 days.

(21) Appl. No.: 15/907,560

(22) Filed: Feb. 28, 2018

(65) Prior Publication Data

US 2018/0259264 A1 Sep. 13, 2018

Related U.S. Application Data

(63) Continuation-in-part of application No. 13/912,783, filed on Jun. 7, 2013, now abandoned, which is a continuation of application No. 13/786,579, filed on Mar. 6, 2013, now abandoned, which is a continuation of application No. 12/945,937, filed on Nov. 15, 2010, now abandoned, which is a continuation-in-part of application No. 12/249,201, (Continued)

(51) Int. Cl.
| | | |
|---|---|---|
| F28D 1/02 | (2006.01) |
| F24S 10/70 | (2018.01) |
| F24S 90/00 | (2018.01) |
| F24F 5/00 | (2006.01) |
| F28D 20/00 | (2006.01) |
| F25B 23/00 | (2006.01) |
| F24S 80/00 | (2018.01) |
| F25B 27/00 | (2006.01) |
| F24S 23/74 | (2018.01) |

(52) U.S. Cl.
CPC .......... *F28D 1/0206* (2013.01); *F24F 5/0046* (2013.01); *F24S 10/744* (2018.05); *F24S 90/00* (2018.05); *F25B 23/006* (2013.01); *F28D 20/0034* (2013.01); *F24S 23/74* (2018.05); *F24S 2080/011* (2018.05); *F25B 27/005* (2013.01); *F28D 2020/0078* (2013.01); *Y02A 30/272* (2018.01); *Y02B 10/20* (2013.01); *Y02E 10/40* (2013.01); *Y02E 10/44* (2013.01); *Y02E 60/14* (2013.01); *Y02E 70/30* (2013.01)

(58) Field of Classification Search
CPC ............... F28D 1/0206; F28D 20/0034; F28D 2020/0078; F25B 23/006; F25B 27/005; F24F 5/0046; F24S 90/00; F24S 10/744; F24S 23/74; F24S 2080/011; Y02E 70/30; Y02E 60/142; Y02E 10/42; Y02E 10/44; Y02B 10/20; Y02B 10/24; Y02A 30/272
See application file for complete search history.

(56) References Cited

U.S. PATENT DOCUMENTS 4,007,776 A * 2/1977 Alkasab ................ F24F 5/0046
165/236
4,052,001 A * 10/1977 Vogt .................... F24D 11/0214
126/585

(Continued)

*Primary Examiner* — Ljiljana V. Ciric
(74) *Attorney, Agent, or Firm* — Daniels S. Polley, P.A.

(57) ABSTRACT

A water tank that is used with a solar air conditioning system and provides a supply of cold water for in-dwellings radiators of the system. In one embodiment, the tank application can begin at 32 F degrees and drop down to many degrees colder, such as, but not limited to, minus 100 F degrees. In one non-limiting embodiment, the tank can hold 2000 gallons of water.

20 Claims, 4 Drawing Sheets

Related U.S. Application Data filed on Oct. 10, 2008, now abandoned, which is a continuation of application No. 12/249,071, filed on Oct. 10, 2008, now abandoned, which is a continuation-in-part of application No. 11/671,547, filed on Feb. 6, 2007, now Pat. No. 7,451,611.

(60) Provisional application No. 60/853,531, filed on Oct. 23, 2006.

(56) References Cited

U.S. PATENT DOCUMENTS

| | | | | |
|---|---|---|---|---|
| 4,070,870 A * | 1/1978 | Bahel | ............... | F24D 11/003 62/235.1 |
| 4,169,554 A * | 10/1979 | Camp | ............... | F24F 3/001 126/610 |
| 4,237,859 A * | 12/1980 | Goettl | ............... | F24D 11/007 126/400 |
| 4,246,886 A * | 1/1981 | Sitzlar | ............... | F24D 11/003 126/588 |
| 4,250,712 A * | 2/1981 | Meloni | ............... | F24D 17/02 62/235.1 |
| 4,257,239 A * | 3/1981 | Partin | ............... | F25B 13/00 62/238.7 |
| 4,277,946 A * | 7/1981 | Bottum | ............... | F25B 30/06 62/235 |
| 4,375,831 A * | 3/1983 | Downing, Jr. | ...... | F24D 11/0214 165/48.1 |
| 4,378,785 A * | 4/1983 | Fleischmann | ...... | F24D 11/0264 126/584 |
| 4,378,787 A * | 4/1983 | Fleischmann | ...... | F24D 11/0264 126/589 |
| 4,456,056 A * | 6/1984 | Sills | ............... | F24F 5/0017 165/45 |
| 4,527,618 A * | 7/1985 | Fyfe | ............... | F24D 11/0221 126/635 |
| 4,607,169 A * | 8/1986 | Donnelly, Jr. | ...... | F03B 13/00 165/48.1 |
| 4,628,696 A * | 12/1986 | Rodgers | ............... | F24D 3/18 62/79 |
| 4,787,444 A * | 11/1988 | Countryman | ...... | F24D 11/0214 165/48.2 |
| 5,183,102 A * | 2/1993 | Clark | ............... | A62C 35/60 165/48.1 |
| 5,465,817 A * | 11/1995 | Muscatell | ............... | B60T 1/08 188/290 |
| 5,467,812 A * | 11/1995 | Dean | ............... | F24F 5/0017 165/62 |
| 5,477,703 A * | 12/1995 | Hanchar | ............... | F24T 10/30 62/260 |
| 5,678,626 A * | 10/1997 | Gilles | ............... | F24F 5/0017 165/62 |
| 5,806,331 A * | 9/1998 | Brown | ............... | F24H 4/04 62/238.6 |
| 5,878,588 A * | 3/1999 | Biancardi | ............... | F24D 17/0005 62/177 |
| 6,138,744 A * | 10/2000 | Coffee | ............... | F24F 5/0046 165/45 |
| 7,243,909 B2 * | 7/2007 | Koplin | ............... | F28C 1/04 261/29 |
| 8,833,098 B2 * | 9/2014 | Wiggs | ............... | F25B 30/06 62/260 |
| 8,931,295 B2 * | 1/2015 | Wiggs | ............... | F25B 30/06 62/260 |
| 9,217,583 B2 * | 12/2015 | Lacalle Bayo | ...... | F03G 6/00 |
| 9,587,890 B2 * | 3/2017 | Yang | ............... | F28D 20/0034 |
| 9,765,993 B2 * | 9/2017 | Gandy | ............... | F24D 11/0214 |
| 10,072,851 B1 * | 9/2018 | Juhasz | ............... | F24S 90/10 |
| 10,422,587 B2 * | 9/2019 | Yang | ............... | F24T 10/30 |
| 2008/0092575 A1 * | 4/2008 | Muscatell | ............... | F24F 5/0046 62/235.1 |
| 2009/0090488 A1 * | 4/2009 | McCann | ............... | F24F 5/0035 165/104.31 |
| 2010/0230071 A1 * | 9/2010 | Slater | ............... | F24D 11/0221 165/45 |
| 2011/0278307 A1 * | 11/2011 | Muscatell | ............... | F24F 5/0046 220/592.2 |
| 2014/0026606 A1 * | 1/2014 | Muscatell | ............... | F04C 18/3442 62/235.1 |
| 2014/0190195 A1 * | 7/2014 | Muscatell | ............... | F04C 23/001 62/235.1 |

\* cited by examiner

WATER TANK FOR USE IN AN AIR-CONDITIONING OR HEATING SYSTEM

This application is a continuation-in-part of U.S. application Ser. No. 13/912,783, filed Jun. 7, 2013, which is a continuation of U.S. application Ser. No. 13/786,579, filed Mar. 6, 2013, which is a continuation of U.S. application Ser. No. 12/945,937, filed Nov. 15, 2010, which is a continuation-in-part of U.S. application Ser. No. 12/249,201, filed Oct. 10, 2008, which is a continuation of U.S. application Ser. No. 12/249,071, filed Oct. 10, 2008, which is a continuation-in-part of U.S. application Ser. No. 11/671,547, filed Feb. 6, 2007, now U.S. Pat. No. 7,451,611, issued Nov. 18, 2008, which claims the benefit of and priority to U.S. Application Ser. No. 60/853,531, filed Oct. 23, 2006. All above-identified applications are incorporated by reference in their entireties as if fully set forth herein for all purposes.

FIELD OF THE DISCLOSURE

The disclosure relates generally to air conditioning systems and particularly to a solar air conditioning system with storage of air conditioning capabilities.

BACKGROUND OF THE DISCLOSURE

High electricity bills from air conditioning and/or heating use for a dwelling are common and reoccurring. Additionally, the manufacture of energy at a power plant causes pollution to be released in the air. Furthermore, electricity availability in undeveloped countries, as well as remote locations in developed countries, may be scarce, on limited basis or often non-existent. As a result, these locations are unable to store foods and liquids requiring refrigeration due to the lack of electricity. For undeveloped countries the lack of electricity is a factor in the poverty, hunger and lack of nourishment for its citizens.

Solar photovoltaic is a current popular technology used as a replacement for traditional electricity sources. However, these devices eventually wear out over time and require maintenance and/or replacement, along with associated labor, all at great expenses. Storage of air conditioning for overnight or prolonged loss of the electric grid may also be achieved through the use of a battery. However, eventually batteries deteriorate and gradually lose capacity with repeated deep cycling, thus, creating more expenses.

It is to these problems that the system and method of the present disclosure is directed.

SUMMARY OF THE DISCLOSURE

A solar air-conditioning system having improved air conditioning storage capabilities is disclosed and is preferably designed to operate with concentrated solar heat supplemented with solar electric cells/battery and if necessary, power from an electric utility grid. The unit of heat added or subtracted can be a British Thermal Unit ("BTU"), which is defined as the amount of heat to raise one pound of water one (1.degree.) degree Fahrenheit. With excess capacity preferably designed in, unused BTUs can be stored and go into reserve for night and cloudy days. The disclosed novel system can use a circulating refrigerant such as, but not limited to, Freon or ammonia in a cycle of compression and expansion, well known in the air conditioning art as the heat pump cycle. Solar concentrators can raise temperature and pressure of the refrigerant. The raised temperature can be dissipated to the atmosphere by passing through a condenser coil and the refrigerant proceeds to the evaporator coil. The evaporator can be located within a water tank containing an anti-freeze water solution. Preferably, the water tank contains at least approximately 1000 gallons of the anti-freeze water solution and preferably 2000 gallons. The water is preferably the storage medium. Heat can be added to or extracted from the storage medium by the evaporator coil.

Preferably, also within the water tank can be a radiator type pickup coil. The pickup coil can be part of a separate chilled water system which can circulate its own water supply through radiators located throughout a building, dwelling, house, etc. (all collectively referred to as "dwelling"). The temperature within this separate system can be the temperature of the water within the tank by simple conduction.

The refrigerant system can include a supplemental compressor which can be electrically driven from one or more, and preferably a plurality or bank of solar electric cells or the power grid. The refrigerant system can also include one-way direction positive displacement rotary valves which can serve to insure proper gas direction.

The present invention can also be used for or applicable to large area coolers or refrigerators and provides a device which can provide refrigeration to areas where electricity is not present or available.

An accumulator tank can also be provided for providing stability in the Freon circuit.

The disclosed water tank or container serves as a storage of cold energy as well as a supply of cold water for in-dwelling radiators. Preferably, the disclosed novel water tank can begin at 32 F (Fahrenheit) degrees and then proceed to many degrees colder or lower. In a preferred but non-limiting embodiment, a minus 100 F degree temperature for the stored water in the tank can be achieved with the use of an anti-freeze mixture.

DETAILED DESCRIPTION

Figure 2:
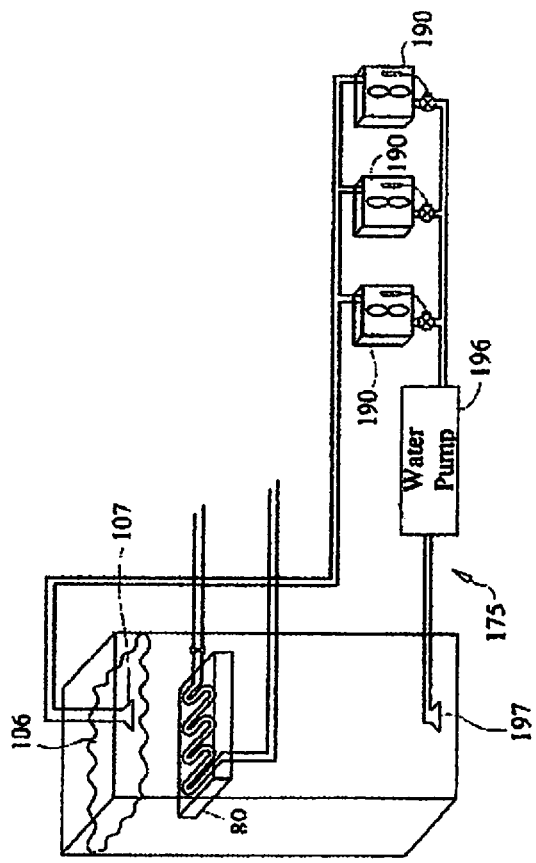
FIG. 2 is a second non-limiting embodiment for the water tank/storage configuration in accordance with the disclosed novel system.
Figure 1:
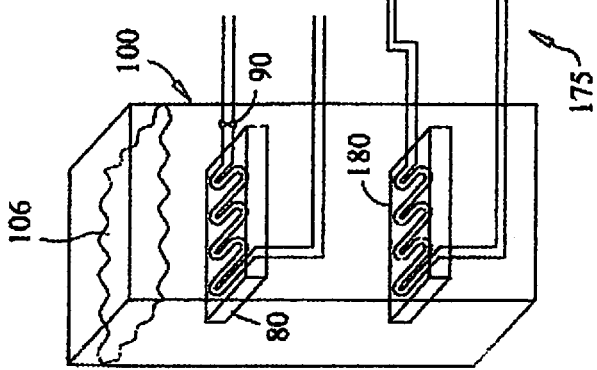
FIG. 1 is a first non-limiting embodiment for a water tank/storage configuration in accordance with the disclosed novel system.

A novel air conditioning system is disclosed, including a novel water tank that is also used as an energy storage member, in addition to its role as a transfer medium for the entire system. FIG. 1 and FIG. 2 illustrate two non-limiting embodiments for the water/storage tank. With the use of the novel water tank disclosed herein, the tank acts as storage of cold energy as well as a supply of cold water for in-dwelling radiators. The novel tank application can begin at 32 F degrees and then drop to many degrees colder, such as but not limited to, minus 100 F degrees with the use of an anti-freeze mixture. Preferably, an amount of energy storage can be dependent on the quantity of water (which can be preferably 2000 gallons for a dwelling, though such amount is not considered limiting and higher and lower amounts can also be used and considered within the scope of the disclosure). The quantity (Q) times the temperature (T) which equals the amount of storage (S) (Q×T=S) for the continued operation during times of limited or no solar or electric grid energy such as during night or cloudy weather conditions. Thus, the disclosed water tank allows for storage of cold energy during the night and well below the freezing point of water and can provide for many hours of cold energy storage.

Using the water contained in the water tank as a storage medium, provides the advantage of the water not wearing out as compared to mechanical devices.

As seen in FIG. 1, water tank 100 also contains a pickup radiator 180 acting as heat exchange coil which functions as part of a separate chilled for heated) water system 175 of air-conditioning (heat) for withdrawing (or adding) heat from (or to) a dwelling or structure. through One or more radiators 190, Pickup radiator 180 in water tank 100 and one more radiators 190 disposed throughout the dwelling can circulate anti-freeze/water by Way of a pump 196, which can be electrically or mechanically driven. The circulation of the water allows heat to be removed from or added to (as desired) from the dwelling. The chilled (heated) liquid or water system in the preferred embodiment is separate and isolated from the storage medium liquid or water. One skilled in the art would include a control, such as a thermostatic control, at each dwelling coil controlling the cold water flow such that the freezing point is not attained in these coils.

The disclosed novel solar air-conditioning system is preferably designed to operate with concentrated solar heat for the heat pump function of the system and uses a circulating refrigerant in a cycle of compression and expansion. Solar concentrators raise the temperature and pressure of the refrigerant. The raised temperature is dissipated to the atmosphere and the refrigerant proceeds to the evaporator coil, which is located within a water tank containing at least 1000 gallons (and preferably 2000 gallons—though not limiting) of an anti-freeze water solution. As the water is the storage medium, heat can be added to or extracted from the storage medium by the evaporator coil. A radiator pickup coil is also located within the water tank and is part of a separate chilled water system which can circulate its own water supply through other radiators located throughout a dwelling.

The below-described systems of the present invention can also be used for or applicable to large area coolers or refrigerators and provides a device which can provide refrigeration to areas where electricity is not present or available.

As seen in FIG. 2 a second pickup coil 180 from earlier embodiment has been eliminated at the bottom of tank 100. in conjunction with water pump 196 and inlet 197, the tank water itself is circulated throughout the dwelling associated with the present invention system and then returned to tank 100 through outlet 107.

The system provides for cold (water) energy attributes which can be used for efficient operation of a solar air conditioning system. The present invention tank permits continued operation of the solar air conditioning system even during periods of intermittent solar energy, In a preferred embodiment, a large quantity of water (1000 gallons or more, including 2000 gallons without limitation) can be used, preferably coupled with temperatures well below the freezing point (anti-freeze mixture—in one non-limiting embodiment all the way down to −100 F degrees) of water to permit the operation of the solar air-conditioning system well beyond the hours of available solar energy. The temperature and quantity of the water can be designed such that they become factors that affect the practical operation of the entire solar air-conditioning system. Through the use of the anti-freeze mixture, the energy storage medium (water) remains in a liquid state at least all the way down to the chosen coldest temperature (in one preferred embodiment,−100 F degrees). Accordingly, at all times the energy storage medium stays in a liquid state or as very cold water/fluid and does not change from one state back to another state.

In one non-limiting embodiment novel solar air-conditioning system that can be used with the water tank of FIG. 1 and/or FIG. 2 can include one or more solar concentrators and preferably a plurality of concentrators 102 (FIG. 3 and FIG. 4) or 509 (FIG. 5) preferably arranged in a parallel configuration or communication with each other. Concentrator(s) 102/509 capture energy from the sun raising the temperature and pressure of the refrigerant within the pipe, tubing, plumbing, conduits, hoses, etc. (all collectively referred to as "pipe" or "piping") at the focal point. Though not considered limiting, the refrigerant can be Freon or ammonia gas. All of the pipe, valves, components, etc. of the present invention are preferably connected to each other through conventional connectors, fasteners, etc.

Figure 5:
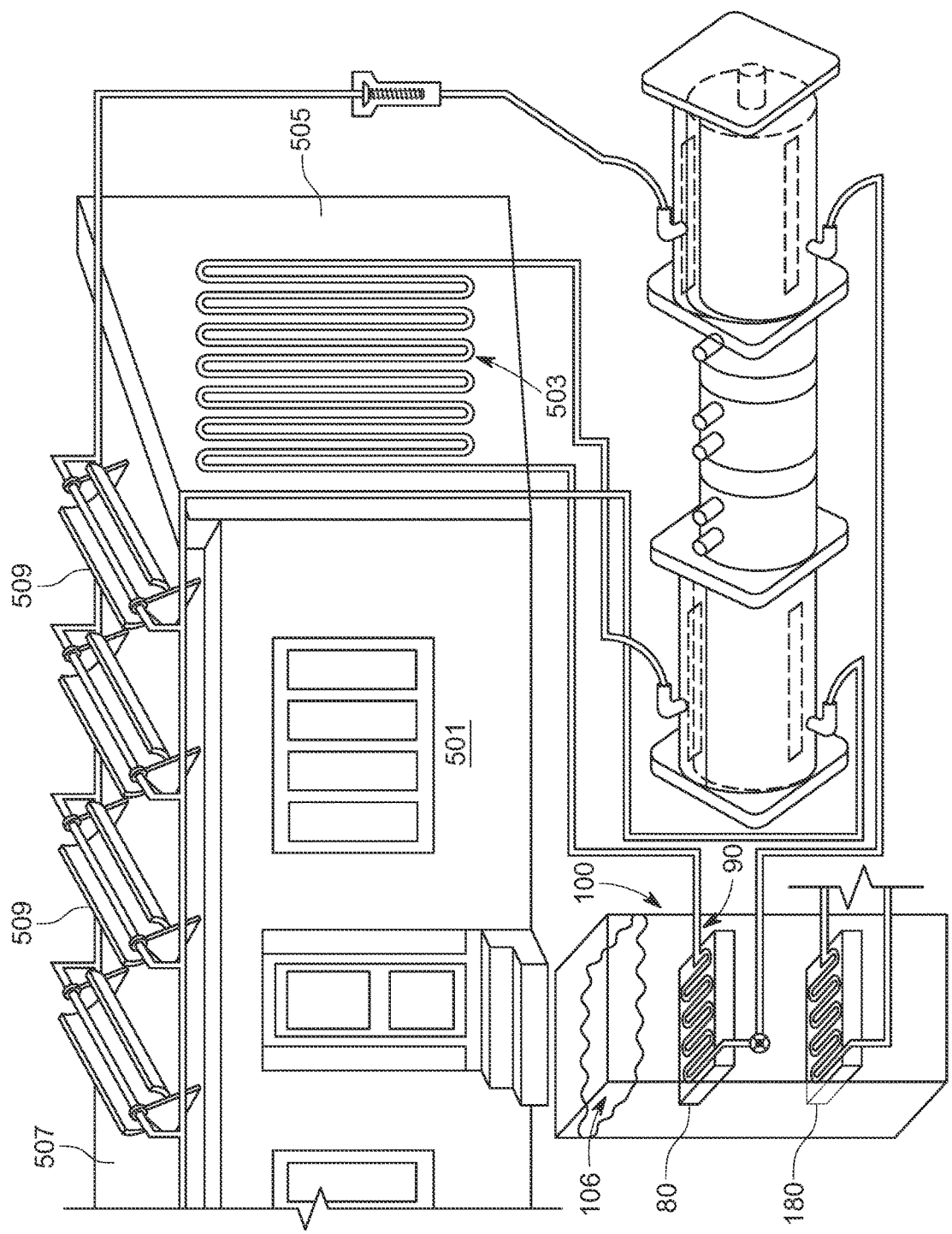
FIG. 5 is schematic/flow diagram of another non-limiting embodiment in accordance with the disclosed system.

The refrigerant within the pipe proceeds or otherwise travels to the one or more heat dissipaters, commonly known as condensers, which can be large area condensers. The number of condensers can correspond to the number of concentrators provided for the system. The condensers dissipate heat from the heated refrigerant to the atmosphere. In an alternative embodiment, the condenser can be a single stand-alone unit, which can include an electrically driven fan similar to conventional condensers. FIG. 5 shows a single large area condenser coil 503.

Figure 3:
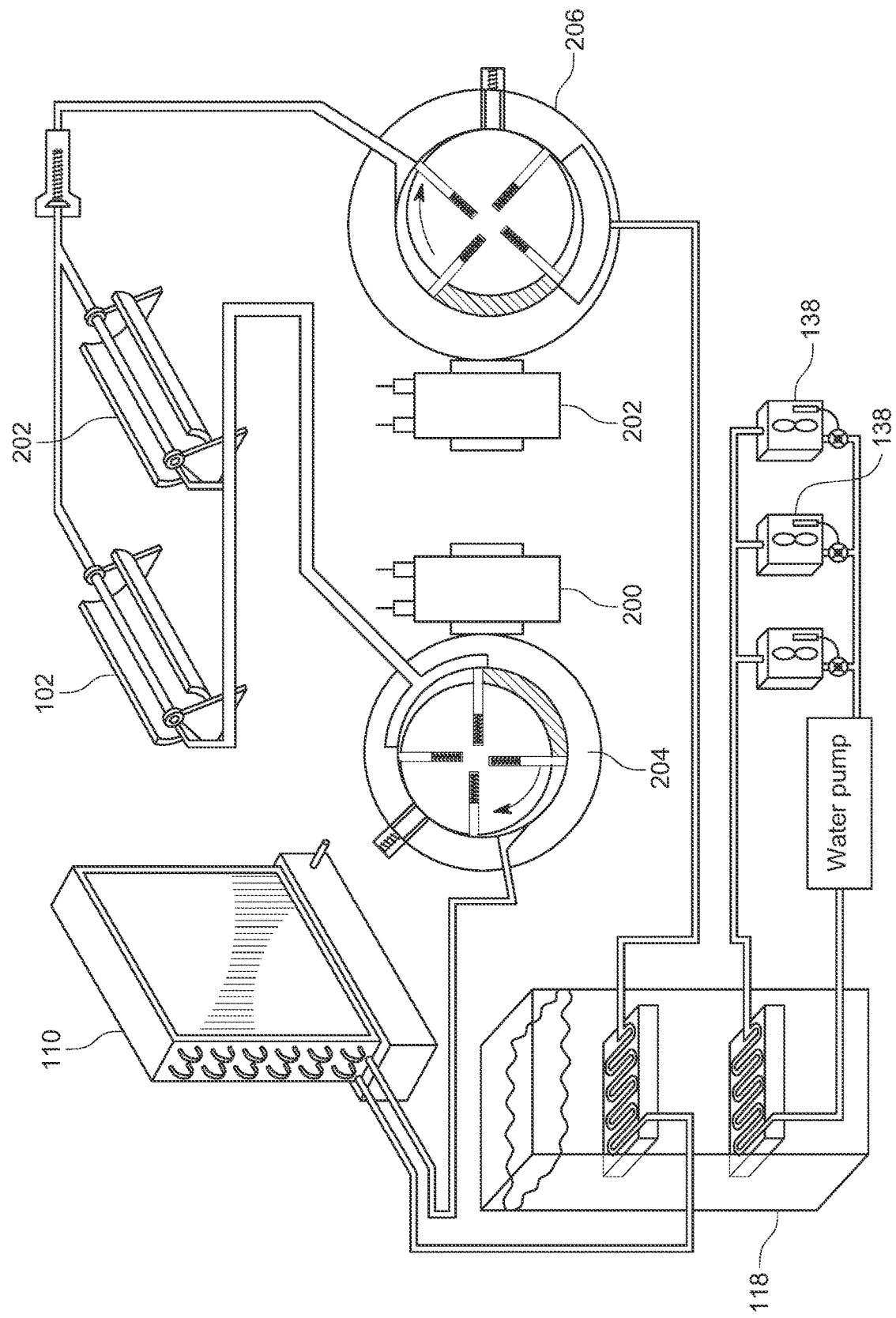
FIG. 3 is a schematic/flow diagram of a non-limiting clutch free embodiment featuring positive displacement valves in accordance with the disclosed novel system.

After leaving the solar concentrator(s), the refrigerant proceeds through a one direction valve, such as valve 204 (FIG. 3). In a preferred embodiment, the one direction valve can be a "high side" positive displacement one direction rotary valve. Valve 204 assures that the refrigerant proceeds in the proper direction through the refrigerant circuit. As shown in FIG. 3, in one embodiment, a plurality of vanes are provided within the valve housing, which are moved by the circulating refrigerant (a portion of the refrigerant within the valve is shown in shading/hatched lines between two of the vanes). Valve 204 can be driven by a motor 200.

As seen in the Figures, from valve 204, the refrigerant travels to condenser 110, and thereafter to an evaporator coil which is preferably fitted with an expansion valve 90 and can be disposed within the novel water tank (. In the preferred embodiment, expansion valve 90 can be an electronically controlled valve, though such is not considered limiting.

Valve 90 can be controlled based on the pressures contained within the refrigerant circuit which can vary as the solar energy varies. The expanding refrigerant within evaporator 80 removes the heat from the coil and medium surrounding evaporator 80 (or evaporator 116 in FIG. 4). Preferably, as mentioned above, evaporator 80/116 can be disposed within a water tank 100. Water tank 100 is preferably large enough in size to hold a large amount of a liquid, such as, but not limited to, approximately two thousand (2000) gallons of the liquid. However, other size water tanks can be used and are considered within the scope of the invention.

Preferably, the liquid 106 contained within water tank 100 (FIG. 1) can be a mixture of water and anti-freeze. Preferably, water tank 100 can be insulated, such as, but not limited to, burying water tank 100 beneath ground level. Additionally, water tank 100 can be greater in height than width to operate co-operatively with temperature stratification. As such, heat can be removed from many gallons of water, which as a non-limiting example is shown by the following factoid using a non-limiting 2000 gallon water tank 100:

British Thermal Unit ("BTU"). 1 BTU=1 pound of water 1.degree. F

Water=8 pounds per gallon; 1 cubic foot=7.4$ gallons 60 pounds of water.

134 cubic feet—8018 pounds of water.

Non-limiting Tank 100 dimensions: 4.2 ft.times.8 ft.times.8 ft=269 cu, ft=2000 gallons 2000 gallons 16,000 pounds 16,000 BTU per degree Fahrenheit.

32.degree. F to 12.degree. F=20.degree. F 20 degree F. times.16,000 BTU=320,000 BTU 320,000 BTU/20,000 BTU hour=16 hours reserve.

Solar Power:

200 BTU/square foot/hour around solar noon.

20,000 BTU's per 100 square feet 40,000 BTU's per 200 square feet

Non-limiting Solar Concentrator 20 dimensions: each 2 ft.times.10 ft. 20 square it 10 units=200 square ft=40,000 BTU/hour The refrigerant exits from evaporator 80 and is directed to a second one directional valve 206 (FIG. 3), which again can be a positive displacement one direction rotary valve. Valve 206 can have a larger positive displacement chamber as compared to valve 204 since it may be working with lower pressures, and thus in the preferred embodiment, can be considered a low pressure valve. Valve 206 can also be driven by an electric motor 202. The vanes of valves 204 and 206 can be spring loaded. A number of conditions throughout the cycle may dictate that valves 204 and 206 operate independently.

Where a compressor is provided it can be driven by a conventional compressor motor. When there is insufficient solar energy (cloudy day, etc.), the system (such as through one or more sensors provided in the circuit) can sense or otherwise determine to activate the compressor motor to electrically drive the compressor. In one non-limiting example, a temperature sensor can be disposed within the water tank for determining when to turn the compressor motor on. Additionally, pressure sensors or other devices can also be used for this purpose. Where a temperature sensor is provided within water tank 100, the compressor can be activated at predetermine temperatures through its connection to a conventional switcher. In one non-limiting example, the predetermined temperature can be anywhere in the range of about 32 degree. F. to about −100 degree. F. However, other temperature values can be used and are considered within the scope of the disclosure.

As mentioned above, water tank 100 can also be used to store air conditioning energy in the form of chilled water, which can be below the freezing point of 32.degree. F, and preferably within the temperature range of 32 degrees. F to −100 degrees F. or about 32 degrees F. to about −100 degrees F. However, the present disclosure is not limited to this specific range and other ranges can be chosen and are within the scope of the invention.

The system can also be complemented with solar electric panels and a battery Electricity derived from this sub-system can drive the compressor. The energy from concentrator(s) and the solar electric can compliment each other to drive the refrigerant within the circuit. Additionally, at times of insufficient solar energy or battery energy, power from a utility grid can supply the energy to drive the compressor. A switching control can be provided for managing or controlling the various energy sources. Thus, the various components help to drive the compressor when needed, which can be considered, though not required, a supplement mode of energy.

It should be recognized that various combinations of concentrator(s), battery(ies), utility grid (conventional electricity), solar panel(s), etc. can be used and all combinations are considered within the scope of the invention. Thus, as non-limiting examples, the complimentary system does not necessarily preclude (1) a system which operates solely on energy from solar concentrators, excluding solar electric; or (2) a system which operates solely on solar electric panels, excluding solar concentrators. Again, the above-described energy sources can be used in various combinations or by themselves and all variations are considered within the scope of the invention.

Though in the preferred embodiment the chilled water system can be an isolated closed system with a pickup coil in the water tank, such is not considered limiting, it is also within the scope of the disclosure to have the system operate with no pickup coil within the tank. Such an alternative version could operate circulating the storage medium water within the water through the in-dwelling radiators.

In one embodiment for the rotary valves, the valve can comprise an outer cylindrical valve body housing having an inlet port and an outlet port. Preferably, the outlet port can be preferably at least one-hundred (100 degrees) degrees in direction of rotation from the inlet port in a four (4) vane configuration and correspondingly so with multiple vanes. An inner rotational cylinder can be disposed within the housing and can be supported by a center longitudinal shaft offset from the center of the outer housing. A plurality of vanes (preferably spring loaded) can be fitted into the cylinder. The vanes can be disposed along the longitudinal axis of the cylinder and preferably equally spaced from each other around the circumference of the cylinder. An inner cylinder support shaft can extend beyond the valve housing such that external appliances can be attached thereto. A portion of the cylinder can be flush against the inner wall of the housing such that the vane is fully compressed. As a gap is created between the portion of the cylinder associated with the vane and the housing, the vane protrudes outward from the cylinder, in view of its preferred spring-loaded configuration.

Fundamental to the "refrigeration" or "heat pump" cycle is a dissipation of the heat of compression. This is usually accomplished by circulating the compressed refrigerant gas through a finned, coil exposed to the atmosphere (i.e. a condenser coil). It may be a large area condenser to dissipate heat by simple conduction or it may be smaller and compact with fan forced air circulation.

In another embodiment or method a condenser coil may dissipate heat to water circulated over its surface. The water can be drawn by a pump from an underground water table. The underground water temperature can be approximately twenty-five (25.degree. F) degrees Fahrenheit cooler than the atmosphere. Other degree differences can also be selected and are considered within the scope of the invention. Thus, the efficiency of the heat dissipation and of the overall cooling is enhanced. This method might circulate water from the water table. Alternatively, water can be sprayed as a mist onto the condenser in its own external evaporation cycle of liquid to gas.

It should be recognized that other concentrators can be used with the present invention system and all are considered within the scope of the disclosure. Certain non-limiting examples of concentrators that can be used are generally shown in U.S. Pat. No. 9,389,008 dated Jul. 12, 2016 and entitled "Solar Energy Air Conditioning System With Storage Capability", which is incorporated by reference in entirety herein.

The above-described and illustrated rotary positive displacement valves provide a unique valve design which can be advantageously optimized for the disclosed novel system. The movement under pressure of a gas or liquid, such as, but not limited to, a refrigerant in liquid or gas form, causes the rotation of the valve. Preferably composed of four chambers in a four-vane version, each vane chamber successively is filled and caused to rotate by the high side pressure on that chamber vane. The chamber is then closed by the following vane and finally emptied as such chamber is decreased in volume due to the preferred offset center, the point of co-incidence of the inner cylinder rotor and the vane and placement of the exit port. The valves may be partially driven by the pressure of the heated gas. Each valve may be caused to rotate independently by associated electric motor(s). Alternatives include controlling according to heat and pressure sensors throughout the refrigerant circuit.

Thus in one embodiment, a rotational multi-vane positive displacement valve is disclosed which can comprise: an outer cylindrical valve body housing having an inlet port and an outlet port and an inner rotational cylinder disposed within the outer cylindrical valve body housing and supported by a longitudinal shaft offset from a center position of the outer housing. The inner rotational cylinder can have a plurality of spring loaded vanes along a substantial portion of its longitudinal axis that are preferably equally spaced around a circumference of the inner rotational cylinder. The outlet port can be located at least 100 degrees in direction of rotation from the inlet port, when the inner cylinder has four vanes. The shaft preferably extends beyond the outer valve housing and can be adapted for attachment to external appliances.

Figure 4:
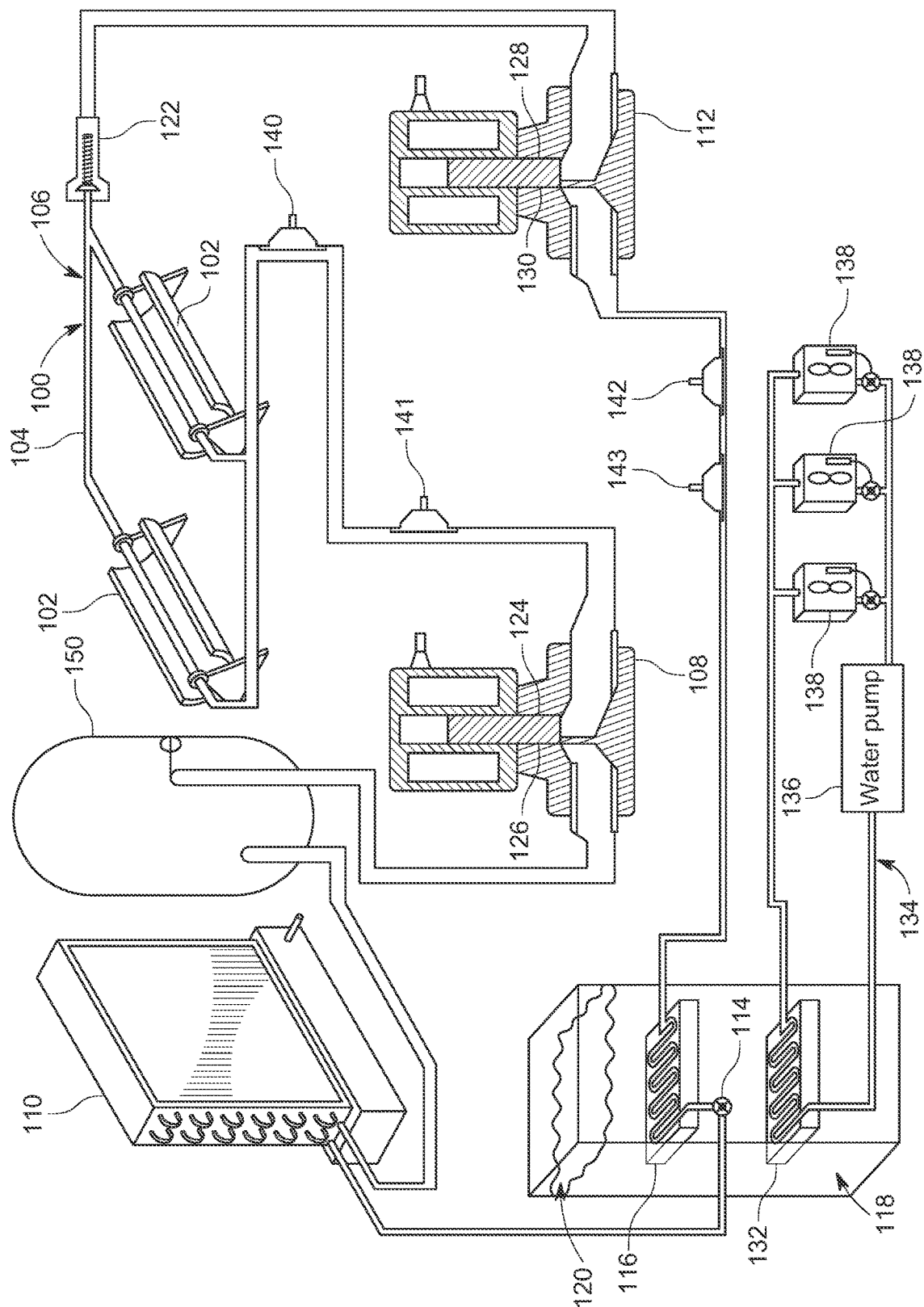
FIG. 4 is a schematic/flow diagram of another non-limiting embodiment featuring solenoid operated valves in accordance with the disclosed novel system and also illustrating the accumulator tank.

As seen in FIG. 4, an accumulator tank or accumulation tank 150 can be provided in the novel air condition system. Tank 150 can be provided with a one-way inlet valve and the tank provides stability in the Freon circuit. The accumulation tank can serve as a reservoir and modulator of pressures in the Freon heat pump cycle.

The rotational valves 204 and 206 in FIG. 3 can be driven by an electric motor 200 and 202. In this embodiment, the system is clutch free. The electric motors can be driven by a control system with inputs of temperature and pressures from various points in the heat-pump cycle. The control system can include temperature and pressure sensors at various places in the refrigerant circuit and relays to switch the electric motors to drive the valves. Non-limiting pressure sensors 140 (high pressure side) and 142 (low pressure side) and non-limiting temperature sensors 141 (high pressure side) and 143 (low pressure side) can be seen in FIG. 4. The number of sensors and their exact location within the system is not considered limiting to those shown in FIG. 4 and other configurations for the sensors can be used and are considered with the scope of the disclosure.

Alternative to the rotary valves can be solenoid valves 108 and 110 (FIG. 4). When two solenoid valves are used, such as for the non-limiting system shown in FIG. 4, they may be simultaneously open to the passage of the refrigerant or simultaneously closed. When closed the refrigerant can be confined to the high side which can be the portion of the refrigerant circuit containing the solar concentrators. Heat and pressure will build. At a predetermined pressure both valves are caused to open. The high-pressure refrigerant equalizes throughout the refrigerant circuit. One-way valve 122 can block movement to the low side. The refrigerant proceeds through the accumulator tank then through the condenser, then through the evaporator coil and then into the low side solenoid valve 112. At this point, the valves can be electrically activated to the closed position and the accumulation of solar energy begins again.

Pressure and temperature values from the sensors can be used by a control system to cause the system to advance the refrigerant. The control system can operate the solenoid valves as described below. In an alternative system using positive displacement valves the control system can direct the valves to operate and advance the refrigerant through the heat pump cycle. The rotary valves may operate independently of each other optimizing refrigerant pressures at various points in the high side and supplementing heat and pressure from the solar concentrators. The control system function is not considered limited to any specific values and all are considered within the scope of the disclosure. The system is not limited to any specific combination or number of valves and various combinations are considered within the scope of the disclosure.

The system is also not considered limited to any particular type of pressure sensor and/or temperature sensors and various types of pressure sensors and temperature sensors can be used with the system and are considered within the scope of the disclosure.

It is also within the scope of the disclosure to include a system having both rotary valve(s) and solenoid valve(s), or other types of valves which will perform the same or similar functions as the rotary or solenoid valves.

The present invention tank can use very low temperatures preferably well below the freezing point of water. The below freezing storage feature helps to prevent having to throttle back to limit temperatures above freezing, which would mean not efficiently using all of the solar energy available for the operation of the solar air-conditioning system. The invention also preferably uses an anti-freeze such that the water preferably never reaches a frozen state. Therefore, so long as the refrigerant cycle continues ever more BTUs are stored for later use by the present invention.

The disclosed water tank can be provided as part of a solar air-conditioning and heating systems and can be used for circulating chilled water/fluid in radiators throughout a dwelling. The water tank also serves as a storage vessel for air conditioning energy. This stored energy can be used or available for use in time of intermittent solar energy and into night. Water is preferably the storage medium and with anti-freeze may store 2000 gallons at temperatures reaching mins (−100° F.) one-hundred degrees Fahrenheit (as a non-limiting example). An evaporator coil is disposed within the tank and the fluid contained within the container. The evaporator coil is part of a refrigerant circuit and as it is made cold, so is the fluid surrounding by conduction. A pickup radiator coil is also contained within the container and fluid for certain embodiments. The pickup coil can consist as part of a chilled water air conditioning system for a dwelling and is also made cold by conduction. The water tank can be located underground and otherwise insulated.

The present disclosure is directed to green solar energy and creating air conditioning from solar. The disclosed system with its novel water tanks allows for solar over-night and at other times when the sun is obscured, such as by rainy overcast weather. The novel water tanks allow for storage of energy from cold water. The system makes excess cold water which is then stored in the preferably insulated tank. Thus, excess cold water is made for storage for use at a later time when sunlight is not available.

In one non-limiting embodiment, a tank with 2000 gallons of anti-freeze water at minus 100 degrees F. provides the cold for in-dwelling radiators for many hours of no solar or for many hours of no grid power in other systems which might provide for storage.

The systems disclosed herein preferably do not freeze water and intentionally avoid freezing through the addition of an anti-freeze added to the water. In the disclosed system 32 degrees F. can be the beginning temperature for the water and the desired temperature can be well below this value and preferably down to minus 100 degrees F., while still remaining in a liquid unfrozen state in view of the addition of the anti-freeze. Thus, the water in the novel tank is more than a transfer substance for one part to another, as it also provides hours stored cold. The quantity of water times the temperatures equals the amount of storage hours.

The invention can also use water in the secondary stem (pickup radiator coil), Another benefit of the invention is that water and anti-freeze are relatively inexpensive and the tank itself has a minimal complexity.

All measurements, dimensions, amounts, angles, values, percentages, materials, degrees, product configuration, orientations, product layout, component locations, sizes, number of sections, number of components or items, etc, discussed above or shown in the Figures are merely by way of example and are not considered limiting and other measurements, dimensions, amounts, angles, values, percentages, materials, degrees, product configuration, orientations, product layout, component locations, sizes, number of sections, number of components or items, etc, can be chosen and used and all are considered within the scope of the invention.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modifications disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A water tank for use in air-conditioning or heating system, comprising: a container storing at least two thousand gallons of a fluid; an evaporator coil disposed within the container and fluid, the evaporator included as part of a refrigerant circuit; and a pickup radiator coil disposed within the container and fluid, said pickup radiator coil included as part of a chilled water air conditioning water system for a dwelling.

2. The water tank of claim 1 wherein said container is insulated.

3. The water tank of claim 2, wherein said container is insulated by burying the container beneath ground level.

4. The water tank of claim 1 wherein said fluid stored within said container is a mixture of water and anti-freeze.

5. The water tank of claim 1 wherein said container is greater in height than width.

6. The water tank of claim 1 wherein said container storing, about 2000 gallons of fluid.

7. The water tank of claim 1 further comprising a temperature sensor disposed within said container for determining when to turn on a compressor motor component of the air conditioning system.

8. The water tank of claim 1 wherein said water contained within the container is stored within a temperature range of about 32 degree F. to about minus 100 degrees F.

9. The water tank of claim 1 further comprising an amount of water stored within the pickup radiator coil which is chilled by the temperature of the water stored by said container.

10. The water tank of claim 9 wherein the amount of water stored within the pickup radiator coil is isolated from and does not contact the water stored by said container.

11. A water tank for use in air-conditioning or heating system, comprising: an insulated container storing at least one thousand gallons of a fluid comprised of a mixture of water and anti-freeze, said container greater in height than width; an evaporator coil disposed within the container and fluid, said evaporator included as part of a refrigerant circuit; and a pickup radiator coil disposed within the container and fluid, said pickup radiator coil included as part of a chilled water air conditioning, water system fur a dwelling; wherein said water contained, within the container is stored within a temperature range of about 32 degree F. to about minus 100 degree F.

12. The water tank of claim 11, wherein said container is insulated by burying the container beneath ground level.

13. The water tank of claim 11, wherein said container storing about 2000 gallons of the fluid.

14. The water tank of claim 11 further comprising an amount of water stored within the pickup radiator coil which is chilled by the temperature of the water stored by said container; wherein the amount of water stored within the pickup radiator coil is isolated from and does not contact the water stored by said container.

15. The water tank of claim 11 further comprising a temperature sensor disposed within said container for determining when to turn on a compressor motor component of the solar air conditioning system.

16. A water tank for use in an air-conditioning or heating system, comprising: a container sized to store about two thousand gallons or more of a fluid; about two thousand gallons or more of a mixture of water and anti-freeze disposed within said container, said container greater in height than width; an evaporator coil disposed within the container and fluid, said evaporator included as part of a refrigerant circuit; a first piping member having an inlet and at least partially disposed within the container, said first piping member inlet serving as the water entry point for a chilled water air conditioning system for a dwelling; a second piping member having an outlet and at least partially disposed within the container, said second piping member serving as the container return point for the water circulated through the air conditioning system; and a water pump for circulating the water entering, the air conditioning system from the container through the first piping member inlet.

17. The water tank of claim 16, wherein said container is insulated by burying the container beneath ground level.

18. The water tank of claim 16, wherein said container sized to store about 2000 gallons of the fluid.

19. The water tank of claim 16, wherein said water contained within the container is stored within a temperature range of about 32 degree F. to about minus 100 degree F.

20. The water tank of claim 16 further comprising a temperature sensor disposed within said container for determining when to turn on a compressor motor component of the air conditioning system.

\* \* \* \* \*